United States Patent
Xu et al.

(10) Patent No.: US 9,679,379 B2
(45) Date of Patent: Jun. 13, 2017

(54) COST-SENSITIVE LINEAR RECONSTRUCTION BASED OPTIC CUP LOCALIZATION

(71) Applicant: AGENCY FOR SCIENCE, TECHNOLOGY AND RESEARCH, Singapore (SG)

(72) Inventors: Yanwu Xu, Singapore (SG); Jiang Liu, Singapore (SG); Jun Cheng, Singapore (SG); Fengshou Yin, Singapore (SG); Wing Kee Damon Wong, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 14/762,793

(22) PCT Filed: Jan. 22, 2014

(86) PCT No.: PCT/SG2014/000026
§ 371 (c)(1),
(2) Date: Jul. 22, 2015

(87) PCT Pub. No.: WO2014/116181
PCT Pub. Date: Jul. 31, 2014

(65) Prior Publication Data
US 2015/0363930 A1     Dec. 17, 2015

(30) Foreign Application Priority Data

Jan. 22, 2013  (SG) .................................. 201300527

(51) Int. Cl.
*G06T 7/00*     (2006.01)
*G06K 9/46*     (2006.01)
(Continued)

(52) U.S. Cl.
CPC .............. *G06T 7/0014* (2013.01); *G06K 9/46* (2013.01); *G06K 9/52* (2013.01); *G06K 9/6215* (2013.01);
(Continued)

(58) Field of Classification Search
CPC ................. G06T 7/0014; G06T 7/0081; G06T 2207/30041; G06T 7/0012; G06T 9/008;
(Continued)

(56) References Cited

U.S. PATENT DOCUMENTS 7,712,898 B2 *  5/2010  Abramoff ............ G06K 9/0061
                                                          351/206
7,905,599 B2    3/2011  Huang et al.
(Continued)

FOREIGN PATENT DOCUMENTS

WO    WO 2009/139722 A1    11/2009
WO    WO 2011/059409 A1    5/2011
WO    WO 2014/031086 A1    2/2014

OTHER PUBLICATIONS

Liu et al. "Optic Cup and Disk Extraction from Retinal Fundus Images for Determination of Cup-to-Disc Ratio." 3rd IEEE Conference on Industrial Electronics and Applications, Jun. 3, 2008, pp. 1828-1832.*

(Continued)

*Primary Examiner* — Jon Chang
(74) *Attorney, Agent, or Firm* — Blakely, Sokoloff, Taylor & Zafman LLP

(57) ABSTRACT

A method is presented to obtain, from a retinal image, data characterizing the optic cup, such as data indicating the location and/or size of the optic cup in relation to the optic disc. A disc region of the retinal image of an eye, is expressed as a weighted sum of a plurality of pre-existing "reference" retinal images in a library, with the weights
(Continued)

being chosen to minimize a cost function. The data characterizing the cup of the eye is obtained from cup data associated with the pre-existing disc images and the corresponding weights. The cost function includes (i) a construction error term indicating a difference between the disc region of the retinal image and a weighted sum of the reference retinal images, and (ii) a cost term, which may be generated using a weighted sum over the reference retinal images of a difference between the reference retinal images and the disc region of the retinal image.

20 Claims, 3 Drawing Sheets

(51) Int. Cl.
    *G06K 9/52* (2006.01)
    *G06K 9/62* (2006.01)
    *G06T 7/11* (2017.01)
(52) U.S. Cl.
    CPC ........ *G06T 7/11* (2017.01); *G06K 2009/4666* (2013.01); *G06T 2207/30041* (2013.01)
(58) Field of Classification Search
    CPC .......... G06T 7/11; G06K 9/46; G06K 9/6215; G06K 9/52; G06K 2009/4666
    USPC ........................................................ 382/128
    See application file for complete search history.

(56) References Cited

U.S. PATENT DOCUMENTS

| | | | |
|---|---|---|---|
| 2009/0268159 A1* | 10/2009 | Xu | A61B 3/102 351/206 |
| 2010/0220906 A1 | 9/2010 | Abramoff et al. | |
| 2011/0091083 A1* | 4/2011 | Liu | A61B 3/12 382/128 |
| 2011/0243410 A1* | 10/2011 | Wong | A61B 3/12 382/128 |
| 2012/0148130 A1* | 6/2012 | Nakano | G06T 7/0081 382/131 |
| 2012/0230564 A1 | 9/2012 | Liu et al. | |
| 2014/0081130 A1* | 3/2014 | Everett | A61B 3/102 600/425 |

OTHER PUBLICATIONS

Xu et al. "Efficient Optic Cup Localization Using Regional Propagation Based on Retinal Structure Priors." Annual International Conference of the IEEE Engineering in Medicine and Biology Society, Aug. 28, 2012, pp. 1430-1433.*
Joshi et al. "Optic Disk and Cup Segmentation From Monocular Color Retinal Images for Glaucoma Assessment." IEEE Transactions on Medical Imaging, vol. 30, No. 6, Jun. 2011, pp. 1192-1205.*
Yin et al. "Automated Segmentation of Optic Disc and Optic Cup in Fundus Images for Glaucoma Diagnosis." 25th International Symposium on Computer-Based Medical Systems, Jun. 20, 2012, 6 pages.*
PCT Notification of Transmittal of the International Search Report and the Written Opinion of the International Searching Authority, or the Declaration for PCT Counterpart Application No. PCT/SG2014/000026, 10 pp., (Jul. 25, 2014).
PCT Notification of Transmittal of International Preliminary Report on Patentability (Chapter II of the Patent Cooperation Treaty) for PCT Counterpart Application No. PCT/SG2014/000026, 12 pp., (Feb. 25, 2015).
K. Sai Deepak, et al., "Content-Based Retrieval of Retinal Images for Maculopathy", Proceedings of the $1^{st}$ ACM International Health Informatics Symposium, IHI '10, pp. 135-143, (Nov. 11-12, 2010).
Zhuo Zhang, et al., "MRMR Optimized Classification for Automatic Glaucoma Diagnosis", $33^{rd}$ Annual International Conference of the IEEE Engineering in Medicine and Biology Society (EMBS), pp. 6228-6231, (Aug. 30-Sep. 3, 2011).
Fengshou Yin, et al., "Model-based Optic Nerve Head Segmentation on Retinal Fundus Images", $33^{rd}$ Annual International Conference of the IEEE Engineering in Medicine and Biology Society (EMBS), pp. 2626-2629, (Aug. 30-Sep. 3, 2011).
Jun Cheng, et al., "Automatic Optic Disc Segmentation with Peripapillary Atrophy Elimination", 33rd Annual International Conference of the IEEE Engineering in Medicine and Biology Society (EMBS), pp. 6224-6227, (Aug. 30-Sep. 3, 2011).
Yanwu Xu, et al., "Efficient Optic Cup Detection from Intra-Image Learning with Retinal Structure Priors", Medical Image Computing and Computer-Assisted Intervention (MICCAI), pp. 58-65, (2012).

* cited by examiner

COST-SENSITIVE LINEAR RECONSTRUCTION BASED OPTIC CUP LOCALIZATION

CROSS-REFERENCE TO RELATED APPLICATIONS

This patent application is a U.S. National Phase Application under 35 U.S.C. §371 of International Application No. PCT/SG2014/000026, filed Jan. 22, 2014, entitled COST-SENSITIVE LINEAR RECONSTRUCTION BASED OPTIC CUP LOCALIZATION, which claims priority to Singapore Patent Application No. 201300527-7, filed Jan. 22, 2013.

FIELD OF THE INVENTION

The present invention relates to methods and systems for processing at least one image of an eye, such as for measurement of a cup-to-disk-ratio (CDR). The CDR measurement may be used as part of a process for glaucoma diagnosis, optionally including also a step of treatment of glaucoma.

BACKGROUND OF THE INVENTION

Glaucoma is a chronic eye condition in which the nerve that connects the eye to the brain (optic nerve) is progressively damaged. Patients with early glaucoma do not have visual symptoms. Progression of the disease results in loss of peripheral vision, so patients may complain of "tunnel vision" (only being able to see the centre). Advanced glaucoma is associated with total blindness.

Worldwide, glaucoma is the second leading cause of blindness, affecting 60 million people by 2010, and responsible for approximately 5.2 million cases of blindness (15% of the total burden of world blindness). The problem is even more significant in Asia, as Asians account for approximately half of the world's glaucoma cases. Finally, because it is a condition of aging, it will affect more people in Singapore and Asia with population aging.

Vision loss in glaucoma cannot be recovered. However, as treatment can prevent progression of the disease, early detection is critical to prevent blindness. Routine screening for glaucoma in the whole population is not cost effective and is limited by poor sensitivity of current tests. However, screening may be useful for high risk individuals, such as first degree relatives of a glaucoma patient, older age (e.g., 65 years and older) and elderly Chinese women (who are at risk of angle closure glaucoma).

Currently, there is no systematic way to detect and manage early glaucoma. Glaucoma patients are often unaware they have the condition, and consult ophthalmologists (eye doctors) only when severe visual loss is already present.

Treatment at this stage is limited to surgery, is expensive, requires skilled personnel, and does not restore vision.

There are three current methods to detect glaucoma:
(1) Assessment of raised intraocular pressure (IOP),
(2) Assessment of abnormal visual field
(3) Assessment of damage to the optic nerve IOP measurement is neither specific nor sensitive enough to be an effective screening tool and visual field testing requires special equipment only present in tertiary hospitals.

Assessment of damage to the optic nerve is more promising and superior to IOP or visual field testing. However, it presently requires a trained specialist (ophthalmologist), or the use specialized equipment such as the HRT (Heidelberg Retinal Tomography) system. Optic disc assessment by an ophthalmologist is subjective and the availability of HRT is very limited because of the cost involved as well as a shortage of trained operators.

It has been observed that glaucoma is associated with "optic disc cupping" in which the central "cup" portion of the optic disc becomes larger in relation to the disc. Optic disc cupping is accordingly one of the most important features in the diagnosis of glaucoma. For the optic disc, a variational level-set approach, which is based on global optimization concepts, can be used to segment the disc boundary and extract the optic disc region from the retinal image. However, segmentation of the optic cup is more challenging than the optic disc due to the optic cup's interweavement with blood vessels and surrounding tissues. Once the cup has been found a cup-to-disc ratio (CDR) value can be obtained. The CDR values are used for the glaucoma screening, diagnosis and analysis.

Segmentation and learning are two classes of widely used methods for optic cup localisation, and several techniques are known for automated glaucoma diagnosis.

For example, the ARGALI (an Automatic cup-to-disc Ratio measurement system for Glaucoma AnaLlysIs) system has previously been developed for glaucoma detection based on a single non-stereo fundus image (PCT/SG2008/000186). In ARGALI, the cup-to-disc ratio is used to automatically measure the optic nerve. The ARGALI system makes use of contour-based methods in the determination of the cup and disc from retinal images, through analysis of pixel gradient intensity values throughout the retinal image. On some occasions, where the gradient values are gradual, difficulties in the correct cup identification can occur.

Another known system, known as the AGLAIA system (disclosed in PCT/SG2010/000434), uses up to 13 image cues for glaucoma diagnosis/screening. However, it has a limitation of confusing of images with very small cups as large cups. Moreover, errors from optic disc and cup segmentation affect the extraction of other features.

In another "kink-based" system that was previously reported, analysis of blood vessel architecture was used to determine the location of the cup within the optic disc. Using this method, bends in the retinal vasculature over the cup/disc boundary, also known as kinks, were used to determine the physical location of the optic cup. Although this method is not reliant on color or pallor, some of the challenges include correct identification of kinks, as well as the non-presence of kinks in some retinal images.

Some other work has also been presented making use of information from stereo photographs for the determination of the optic cup and disc. While some of the results presented are promising, the key challenge lies in the use of stereoscopic photography as compared to monocular photography. Stereoscopic photography demands specific hardware and requires specialized training, both of which may be unsuitable for the needs for mass screening.

Discriminatory color-based analysis has also been used to determine the location of the cup and disc from retinal images. Histogram color analysis was performed on the image to determine the threshold cutoff between the cup and the disc. To determine the disc, statistical analysis of the pixel intensities was performed on different features of the retinal image. However, no results were presented on the accuracy of results compared to clinical ground truth.

Furthermore, a sliding window-based regional ranking approach has been proposed for optic cup localization. Sliding windows are used to generate as many cup candidates as possible, and a pre-learned regression model is used to rank all the candidates. Finally an unique cup location is determined using non-maximal suppression (NMS). This method is relatively slow, and in fact presently takes 6 mins per image.

In other previous work, the input disc image is first segmented into "superpixels". Superpixels corresponding to blood vessels are next removed. The remaining superpixels are labelled as the cup or rim based on structure priors and the labels are propagated to remaining superpixels. After the superpixel label refinement, a cup location is determined by ellipse fitting. This method is the state-of-the-art optic cup localization method, which has high accuracy and relatively high speed. However, a yet higher speed and accuracy would be desirable.

In summary, segmentation methods have been used widely for cup localization, segmentation methods in the past decade. Recently, some learning based method has been introduced and achieved some improvement. However, most of these methods aim at either small CDR error or diagnosis accuracy, and the practical requirements are difficult to meet by current state-of-art methods.

SUMMARY OF THE INVENTION

The present invention aims to provide an effective and efficient method to obtain, from one or more retinal images (particularly non-stereo images), data characterizing the optic cup, such as data indicating the location and/or size of the optic cup. The location and/or size may be expressed in relation to a pre-specified optic disc, such as an optic disc segmented by ASM or other established algorithms.

In general terms, the invention proposes a linear reconstruction approach, in which a disc region of a given retinal image ("test image") of an eye, is expressed as a weighted sum of a plurality of pre-existing "reference" retinal images in a library, with the weights being chosen to minimize a cost function. The data characterizing the cup of the eye is obtained from cup data associated with the pre-existing disc images, and from the corresponding weights.

The cost function typically includes a construction error term indicating a difference between the disc region of the retinal image and a sum of the reference retinal images weighted by the corresponding weight value $w_i$. The construction term is chosen to be smooth.

The cup data includes numerical values describing the position of the cup in the reference retinal images and/or the CDR value of the reference retinal images.

The present invention is inspired by an atlas-based method which has been used for other medical image segmentation problems (such as tumors). The invention introduces linear reconstruction-based methods, such as sparse coding and LLE (Locally linear embedding), into the optic cup localization problem.

According to our experiments, the use of linear reconstruction methods (e.g., linear reconstruction with a sparse constraint) can be performed with higher accuracy if the method further includes a process for selecting, or emphasizing, those of the reference retinal images which are most similar to the disc region of the test image. Thus we introduce a cost/penalty term to LLE, to simultaneously minimize the reconstruction error and the reconstruction cost.

Like the construction error term, the cost/penalty term is chosen to be smooth, so that the overall cost function is smooth too (as in conventional LLE) and preferably has a closed form solution. Thus the new method has a higher performance, 100% repeatability, and a higher speed, and is more robust.

The cost term may be specified in any of a number of ways. Preferably, it is sum over the reference retinal images of a respective cost value for each reference retinal image, weighted by the corresponding weight value.

In one possibility, the cost term may be generated using a weighted sum over the reference retinal images of cost values $d_i$, indicative of a difference between the disc region of the test image and the corresponding i-th reference retinal image.

Another possibility would be to identify a predefined number (say "M") of the reference retinal images which are the closest (i.e. have least difference to) the test image (in other words, these are the M nearest neighbors to the test image). Then the cost value can be chosen to be very high (effectively infinite) for all the other reference retinal images. For the M nearest-neighbour reference retinal images, the cost value takes a much smaller value, e.g. 0 or 1 for all of them. When the cost function is minimized, this forces the weight values to become zero except for the M nearest neighbour reference retinal images. The resultant algorithm is equivalent to the LLE form of linear reconstruction.

The method typically includes a step of segmenting the test image to extract the disc region. The reference retinal images are themselves preferably disc regions of previously-imaged eyes. The step of segmenting the images of those eyes may be done at the time the present method is carried out, or more preferably in advance.

Experimentally, embodiments of the present invention have been found to have high accuracy for both cup localization and glaucoma diagnosis.

The cost function is preferably chosen to be one such that the optimal weights may be expressed as a closed form solution. This means that no training process is required, and therefore high processing speed may be achieved. In this case, the method is especially suitable for (offline) batch processing. Furthermore, the method is robust, i.e. stable with 100% repeatability. Experimentally, it has been found that diagnosis accuracy is not very sensitive to disc localization errors.

The proposed technique also has potential applications to diagnosis of other eye illnesses.

The proposed method has the following novel features:

1) As mentioned above, the method makes use of a database of existing retinal images and associated cup data, which may be considered a "codebook". In other words, the present method is a knowledge-based optic cup detection method, and in fact, so far as we know, it is the first knowledge-based optic cup detection method, which is different from existing segmentation based methods;

2) It is very fast and robust, especially for large scale batch processing, making it suitable for population study and screening, as well as the basis for a cloud-based remote service;

3) It has a tolerance to disc segmentation error, which avoids being dependent on optic disc accuracy and can be easily combined with other new or existing disc segmentation methods;

4) Since it is a knowledge(codebook)-based method, its performance can be further improved by extending the codebook with new domain knowledge.

The invention may be expressed as a method of obtaining data about the cup of the eye, or as a computer system programmed to perform the method, or as software in a computer program product, such as a non-transitory program stored on a tangible recording medium, operative when performed by a processor to cause the processor to perform the method. The invention may also be expressed as a method to diagnose glaucoma (or another disease) including a step of using the data about the cup of the eye to make the diagnosis. It may even be expressed as a method of treating glaucoma (or other disease) including performing the diagnosis and then, if glaucoma is diagnosed, performing a treatment step.

BRIEF DESCRIPTION OF THE DRAWINGS

An embodiment of the invention will now be described for the sake of example only, with reference to the following drawings in which.

DETAILED DESCRIPTION OF THE EMBODIMENT

Figure 1:
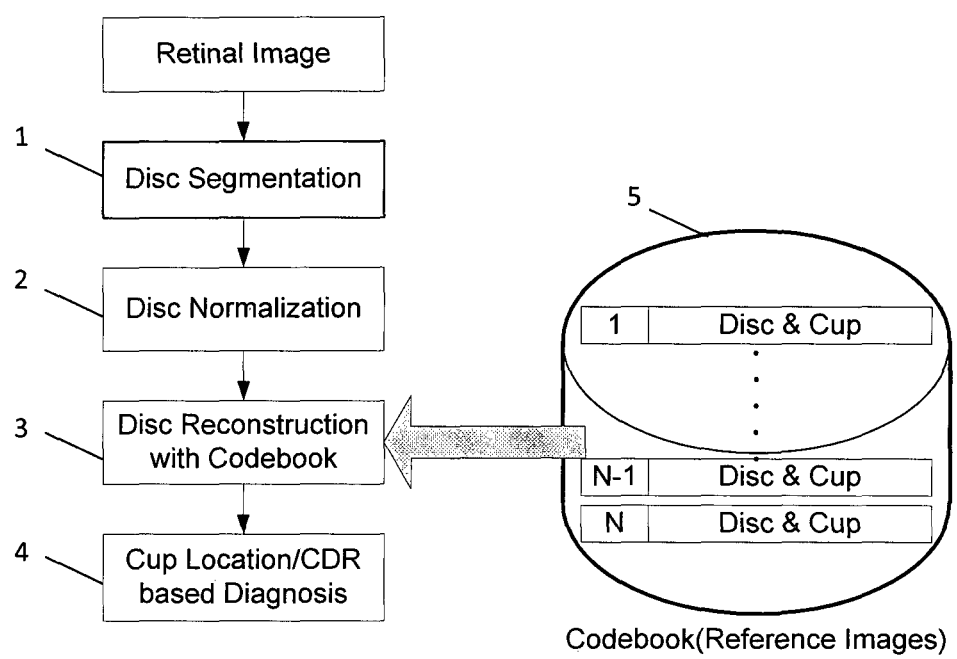
FIG. 1 is a flow chart of the steps of the embodiment.

Referring to FIG. 1, the steps are shown of an embodiment of the invention, which performs Optic Cup Localization. As described in detail below the method employs cost-sensitive Linear Reconstruction.

The starting point of the embodiment is a single, non-stereo retinal image of an eye (typically a fundus image), referred to as the test image. In step 1, the optic disc of this eye is segmented within the test image using existing methods, for example Active Shape Model and template matching. Active shape matching is described at Yin, F., Liu, J., Ong, S. H., Sun, D., Wong, D. W. K., Tan, N. M., Baskaran, M., Cheung, C. Y., Aung, T., Wong, T. Y., Model-based Optic Nerve Head Segmentation on Retinal Fundus Images. In: IEEE Int. Conf. Engin. in Med. and Biol. Soc., pp. 2626-2629 (2011) . Template matching is described at, J., Liu, J., Wong, D. W. K., Yin, F., Cheung, C. Y., Baskaran, M., Aung, T., Wong, T. Y.: Automatic Optic Disc Segmentation with Peripapillary Atrophy Elimination. In: IEEE Int. Conf. Engin. in Med. and Biol. Soc., pp. 6224-6227 (2011).

In the case that the test image is of a left eye, the method is applied directly, but if the test image is of a right eye, it is flipped to the left first.

In step 2, the segmented disc is normalized to a unified circle with a radius of 128 pixels. Furthermore, each pixel value is scaled to the range 0~1 by dividing 255 and then subtracting the mean value of the whole disc to eliminate the influence of the illumination change.

In step 3, the normalized disc is used in a cost-sensitive linear reconstruction method to estimate the cup location. Then in step 4, the cup location is used to obtain a CDR value for glaucoma diagnosis.

We now turn to a detailed description of how step 3 is carried out. The method employed a database 5 of N reference ground truth disc images (codebook) indexed by the integer variable i. These are denoted by $X=\{x_1, x_2, \ldots x_i, \ldots x_N\} \in R^{k \times N}$, where k is the number of pixels in the disk of the reference images (i.e. in our experiments using discs with radius 128, k should be 3.14*128*128=51,446. For each reference ground truth disc image the database 5 also contains four numbers referred to as cup data, describing the corresponding ground truth cup. The cup data is denoted $C=\{c_1, c_2, \ldots c_i, \ldots c_N\} \in R^{4 \times N}$ where $c_i=\{u_i, v_i, a_i, b_i\}$ denotes the cup descriptors of the i-th reference disc. $u_i$ and $v_i$ are the co-ordinates of the centre location of the ellipse cup for the i-th reference disk image, and $a_i$ is the horizontal diameter. $b_i$ is its CDR (which is also half of the vertical diameter of the cup. Here $a_i$ and $b_i$ are in the range $0 < a_i, b_i < 1$, and the diameter of the disc is 2. In other embodiments, different cup data can be used, e.g. the values $b_i$ alone.

We denote the normalized disc obtained in step 2 by $y \in R^{k \times 1}$. Step 3 finds a set of N weight values $w=\{w_i\}$ where $w \in R^{N \times 1}$, $|w|=1$. The set of weight values functions as an optimal linear reconstruction coefficient to minimize the reconstruction error $\|y - Xw\|^2$.

After w is obtained, step 4 estimates the location and/or CDR of the cup of y by using Cw. The cup is assumed to be a non-rotated ellipse. To find the location of the cup of y, step 4 uses some or all of $\{u_i, v_i, a_i, b_i\}$. For example, the u for the cup of the test image y is just the vector product of the $\{u_i\}$ and w. More generally, to estimate any one (p) of the four parameters u, v, a or b, we simply multiply $\{p_i\}$ by w. Thus, to find the CDR of the cup of y, only $\{b_i\}$ may be used. The estimated CDR is just the product of the N-vectors w and $\{b_i\}$.

To do the reconstruction with fewer but more related images in the codebook, instead of using them all, we introduce a cost/penalty term into the objective function. We first construct a cost vector $d=\{d_1, d_2, \ldots d_i, \ldots d_N\}^T \in R^{N \times 1}$ for the reference ground discs X, where $d_i$ is the cost of using $x_i$ for reconstruction, then we can compute the whole reconstruction cost $\|d \circ w\|^2$ and minimize it together with the reconstruction errors, where $\circ$ denotes the Hadamard product. Thus we can obtain the cost function $$\underset{w}{\operatorname{argmin}} \|y - Xw\|^2 + \lambda \|d \circ w\|^2 \quad \text{s.t.} \quad |w| = 1 \quad (1)$$

which can be easily solved by using Lagrange Multiplier method, and the solution is in closed form:

$$w = \frac{1}{1^T(\hat{X}^T\hat{X} + \lambda D^T D)1}(\hat{X}^T\hat{X} + \lambda D^T D)^{-1} 1, \hat{X} = (1^T \otimes y - X). \quad (2)$$

If there are multiple test images for a single patient, the method may find a CDR for each separately (by finding a respective set of weights for each image, and then a CDR (or other data characterizing the cup) for that set of weights) and then averaging them. If there are test image(s) for multiple patients, then the image(s) for each patient are treated separately using the method above.

For simplicity and matching our observation, we define the cost $d_i$ as the (normalized) Gaussian Distance between the testing sample and the i-th reference disc in our implementation, i.e., $$d_i = e^{\frac{\|y - x_i\|^2}{2\delta_f^2}},$$

where $\delta_f$ is a parameter to control the feature noise. Note that if $d_i$ is small, the influence of the corresponding reference disk will be greater. Since $d_i$ is not infinite for any image, this means that all N images still have some influence. However, in a possible variant of the method it would be possible to exclude completely images for which the cost value is, for example, above a certain threshold, i.e. there are few reference discs but ones which are more highly related to the test image. This may result in the algorithm operating at a higher speed.

Experimental Results

Two large datasets ORIGA and SCES were used for testing. The ORIGA dataset comprises 650 retinal images with manually labeled ground truth disc/cup boundaries and clinical diagnosis results; the SCES dataset comprises 1766 retinal images with clinical diagnosis only.

We tested the proposed method with several settings on these two datasets. For a comparison of cup localization accuracy, the metrics $m_1$, $m_2$ and CDR error ($\delta$) are computed with following definition:

$$m_1 = 1 - \frac{\text{area}(D \cap G)}{\text{area}(D \cup G)}, m_2 = \frac{|\text{area}(D) - \text{area}(G)|}{\text{area}(G)}, \delta = |cdr(D) - cdr(G)|,$$

where D and G are the detected cup and ground truth cup, area( ) and cdr( ) are the functions for calculating the area and CDR value respectively. To compare the diagnostic capabilities of the different methods, receiver operating characteristic (ROC) curves of different methods are plotted on the same figure and area-under-curve (AUC) values are also calculated for comparison.

When using the ORIGA dataset, with the ground truth cup available, we can test both cup localization accuracy ($m_1$, $m_2$ and CDR error) and diagnostic accuracy (AUC). However, for the SCES dataset, only diagnostic performance using the AUC can be compared.

(i) Codebook generation: For codebook generation, a random sampling method with even distribution was used, in order to cover a full range of all possible CDR values without any bias. Fore example, when the size of the codebook is set to N (discs), since CDR is between 0 and 1, then for each subset with CDR in {0, 0.1, 0.2, . . . , 0.9, 1} (s=11 subset), N/s discs are randomly selected from the whole sample set with corresponding CDR value.

(ii) Settings of the proposed method: To test the robustness of the proposed method and the influence of disc detection accuracy/method, we designed the following experiments.

1) Test on the ORIGA dataset, using 100 randomly selected images with manually labelled ground truth cups and discs as reference to test the other 550 images. To make the reference images cover a wide range of CDR, we categorized the disc into 3 groups: large, median and small. The reference images were randomly selected from the 3 groups according to prior ratio.

2) Test on the ORIGA dataset, using ASM/template matching method to detect all the discs first, and then using 100 random selected images with ground truth discs and cups as a reference to test on the other 550 detected discs.

3) Test on the ORIGA dataset, using ASM/template matching method to detect all the discs first, and then use 100 random selected detected images with corresponding ground truth cup descriptors as reference to test on the other 550 detected discs.

4) Test on the SCES dataset, using all of the 650 ORIGA discs with ground truth cup descriptors as reference (codebook) to test on all of the 1676 SCES images. For reference images, discs were manually labeled ground truth, for SCES images, discs are segmented by using ASM/template.

5) Test on the SCES dataset, using all of the 650 ORIGA discs with ground truth cup descriptors as reference (codebook) to test on all of the 1676 SCES images. For all images, ASM/template matching method is used to obtain the discs.

Figure 2:
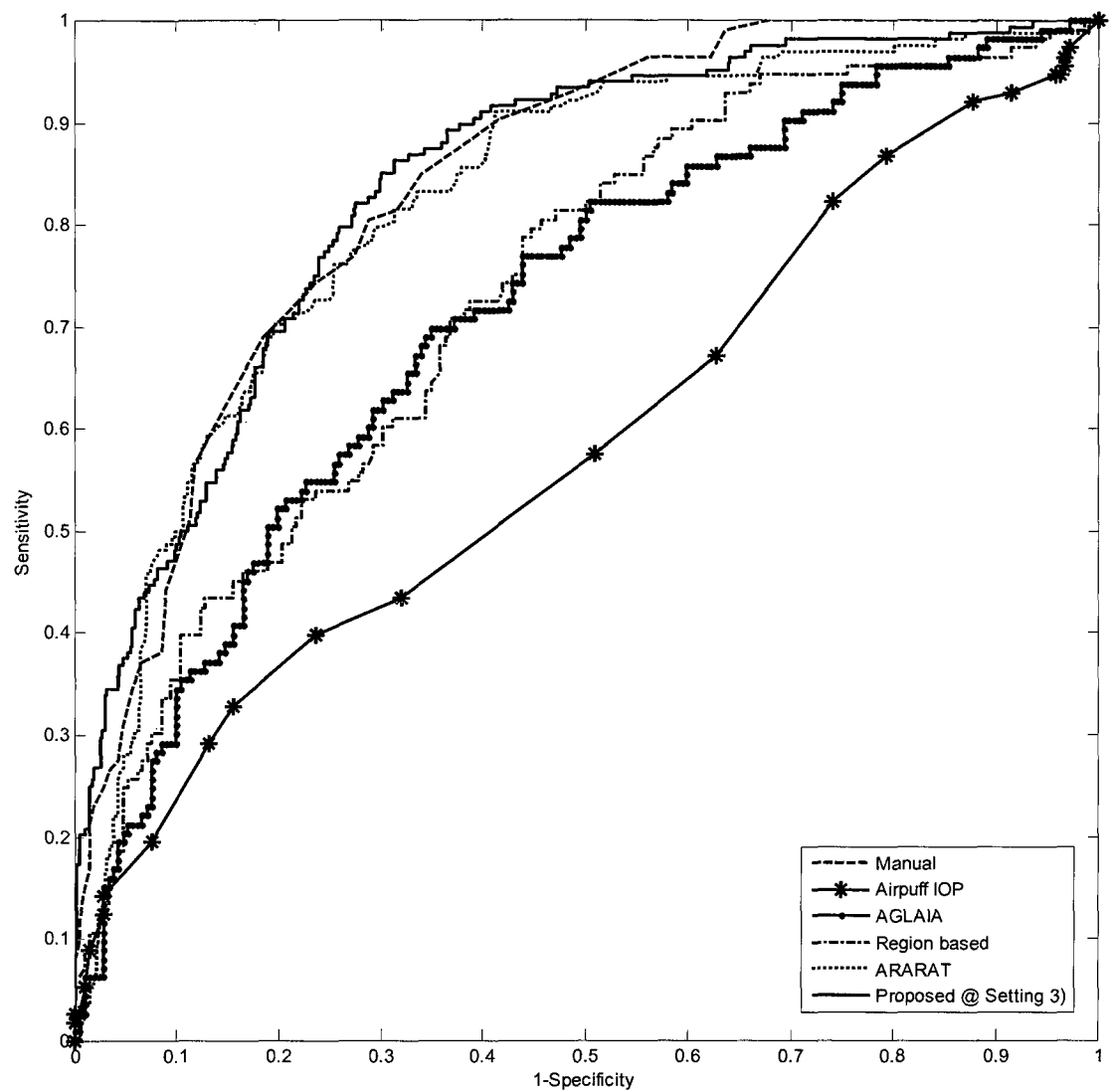
FIG. 2 compares the Glaucoma diagnosis performance of the embodiment of FIG. 1 with other algorithms, using a first dataset (ORIGA)
Figure 3:
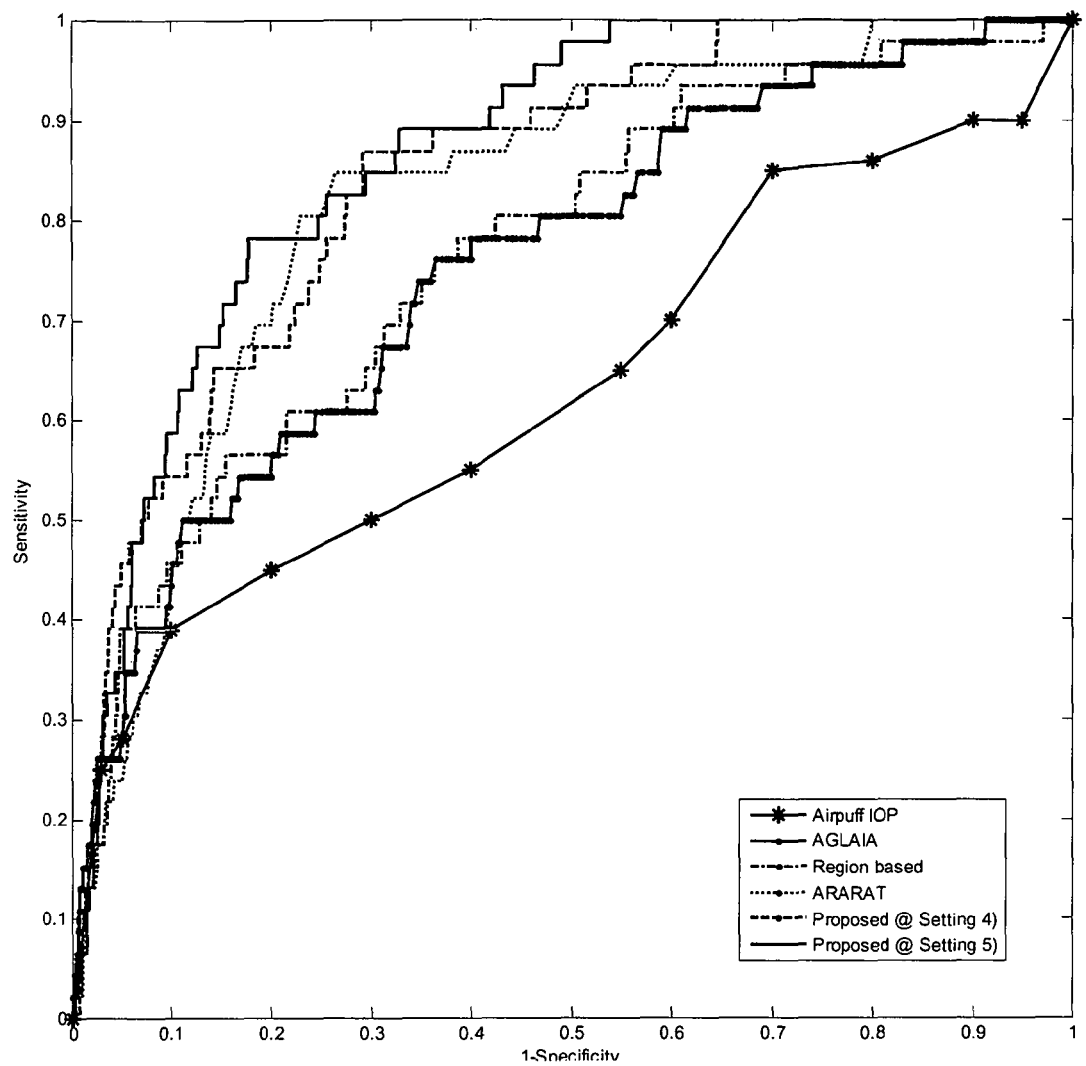
FIG. 3 compares the glaucoma diagnosis performance of the embodiment of FIG. 1 with other algorithms, using a second dataset (SECS).

In the experiments, we compared the embodiment with the following publicly-known systems: AGLAIA (which can be considered as a pixel based method), air puff IOP measurement (state-of-the-art method used clinically), region based ranking and two superpixel-based methods. A first of the super-pixel based methods, referred to here as ARARAT, is the one disclosed in PCT/SG2013/000370, which performs both disk and cup localization. The other superpixel based method (referred to below as the "second super-pixel based method") is as disclosed in the paper "Efficient Optic Cup Detection from. Intra-Image Learning with Retinal Structure Priors" by Y. Xu, J. Liu, S. Lin, D. Xu, C. Cheung, T. Aung and T. Y. Wong in Medical Image Computing and Computer-Assisted Intervention (MICCAI), 2012, Pages 58-65, which focuses on cup localization only. For cup localization accuracy comparison, the results tested on the ORIGA dataset are listed in Table 1. The glaucoma diagnosis (based on CDR) performance comparison on the ORIGA and SCES datasets is shown in FIGS. 2 and 3, respectively. From Table 1, one can observe that the proposed method significantly improved the cup localization accuracy. Compared with AGLAIA, the relative error deduction on $m_1$, $m_2$ and CDR error were 43%, 48% and 30%, respectively. Compared with the state-of-the-art method ARARAT, the relative error deduction on $m_1$, $m_2$ and CDR error were 8%, 22% and 13%, respectively.

TABLE 1

Performance comparison for cup localization using the ORIGA dataset

| Method | $m_1$ | $m_2$ | CDR error |
|---|---|---|---|
| AGLAIA | 0.40 | 0.44 | 0.10 |
| Proposed @ Setting 1) | 0.23 | 0.22 | 0.07 |
| Proposed @ Setting 2) | 0.23 | 0.24 | 0.07 |
| Proposed @ Setting 3) | 0.22 | 0.21 | 0.07 |
| Region based | 0.28 | 0.31 | 0.09 |
| Second Superpixel based method | 0.27 | 0.29 | 0.08 |
| ARARAT | 0.24 | 0.27 | 0.08 |

Comparing the proposed method with the 3 different settings, one can observe that, the proposed method is robust and not very sensitive to the method by which the disc is obtained (e.g., manual and ASM/template matching), and can achieve slightly better performance when the reference discs and test discs are obtained by using the same method, which can be treated as feature alignment pre-processing. The algorithm which is an embodiment of the invention had a 15.7% improvement in quality compared to the second super-pixel based method, were 200 times faster, and were more stable with respect to different disc segmentation algorithms. Comparing the embodiment to ARARAT, the improvement in ml (which is the unique evaluation metric of cup localization accuracy) is 8.3%. The present algorithm had a 12.5% improvement in CDR error compared to both the superpixel-based methods.

From FIG. 2 and FIG. 3, one can observe that the proposed method outperforms the other methods on both datasets.

In fact, remarkably, as may be seen from FIG. 2, the present method actually performs better glaucoma diagnosis than when the images are segmented manually. This is because CDR (as obtained by a manual method) is not perfectly correlated with correct diagnosis of glaucoma. Cases are known in which the manually-derived CDR is 0.8, but there is no glaucoma; conversely, cases are known in which the manually-derived CDR is 0.4 but glaucoma is present. Although, by definition, the cup cannot be segmented better by the present method than by a manual segmentation (since our measure of how well the present method is performing segmentation is by comparing how closely it matches the manual segmentation), the CDR produced by the method is actually better correlated with a correct diagnosis of glaucoma than the CDR produced manually.

INDUSTRIAL APPLICATION

The proposed approach can achieve high accuracy for optic cup localization, and glaucoma diagnosis. It has acceptable tolerance to disc segmentation error, and is fast and robust in batch processing. It is thus suitable for performance by single local machines or by cloud-based services.

Variants of the Embodiment

Many variations of the embodiment can be made within the scope of the present invention. For example, the cost value $d_i$ can be set in any of a number of different ways, representing different measures of the difference (similarity) of the images.

Furthermore, although in the embodiment described above the images (both the test image $y \in R^{k \times 1}$ as modified in steps 1 and 2, and the reference retinal images $\{x_i\}$) employed in step 3 are simply circles of predetermined size, both kinds of images may be represented in many other ways. That is, step 2 may be changed so as to reformat the test image in a different way, and in step 3 the reference retinal images are also in this format. In a first example, the radius of the k images at the start of step 3 may of course may be different.

What is claimed is:

1. A method for obtaining, from a retinal image of an eye, data characterizing the cup region of the optic disc of the eye, the method comprising:
   (a) using a database of N reference retinal images, labelled by an index i=1, . . . N, each reference retinal image being associated with corresponding cup data characterizing a corresponding cup region of the reference retinal image, to obtain, for each reference retinal image i, a corresponding weight value w, the weight values minimizing a cost function comprising:
   a construction error term indicating a difference between a portion of the retinal image and a sum of the reference retinal images weighted by the corresponding weight value $w_i$, and
   a cost term; and
   (b) using the set of weight values and the corresponding cup data, to obtain the data characterizing the cup region of the optic disc of the retinal image.

2. The method of claim 1, wherein the method further comprises an operation of obtaining for each of the reference retinal images, a corresponding cost value $d_i$, indicative of a difference between the portion of the retinal image and the corresponding i-th reference retinal image;
   the cost term being generated using a sum over the reference retinal images of the cost values weighted by the corresponding weight values.

3. The method of claim 2, wherein the construction error term is in the form $\|y-Xw\|^2$ where y denotes the portion of the retinal image, Xw denotes the product of a matrix X of the reference retinal images and a vector w composed of the weight values.

4. The method of claim 3, wherein the cost term is $\|d \circ w\|^2$, where $d=\{d_1, d_2, \ldots d_i, \ldots d_N\}^T \in R^{N \times 1}$, and $\circ$ denotes the Hadamard product.

5. The method of claim 4 wherein $$d_i = e^{\frac{\|y-x_i\|^2}{2\delta_f^2}},$$

where $\delta_f$ is a numerical parameter.

6. The method of claim 1 in which the data characterizing the cup region of the eye comprises a cup-to-disc ratio value.

7. The method of claim 1 further comprises an operation of selecting said portion of the retinal image by segmenting the disc region in the retinal image.

8. The method of claim 1 in which the data characterizing the cup region of the optic disc of the retinal image comprising data indicating at least one of (a) a size of the optic cup and (b) a location of the optic cup.

9. The method of claim 1 in which the corresponding cup data comprises at least one of (a) a cup-to-disc ratio value, (b) a location of the cup, (c) a size of the cup and (d) clinical glaucoma diagnosis results of the eye.

10. A system for obtaining, from a retinal image of an eye, data characterizing the cup region of the optic disc of the eye, the system comprising:
   a database of N reference retinal images, labelled by an index i=1, . . . N, each reference retinal image being associated with corresponding cup data characterizing a corresponding cup region of the reference retinal image, and
   a processor, arranged:
   (a) to obtain, for each reference retinal image i, a corresponding weight value $w_i$, the weight values minimizing a cost function comprising:
   a construction error term indicating a difference between a portion of the retinal image and a sum of the reference retinal images weighted by the corresponding weight value $w_i$; and
   a cost term; and
   (b) to use the set of weight values and the corresponding cup data, to obtain the data characterizing the cup region of the optic disc of the retinal image.

11. The system of claim 10, wherein the processor is arranged to obtain for each of the reference retinal images a corresponding cost value $d_i$, indicative of a difference between the portion of the retinal image and the corresponding i-th reference retinal image,
   the cost term being generated using a sum over the reference retinal images of the cost values weighted by the corresponding weight values.

12. The system of claim 11, wherein the construction error term is in the form $\|y-Xw\|^2$ where y denotes the portion of the retinal image, Xw denotes the product of a matrix X of the reference retinal images and a vector w composed of the weight values.

13. The system of claim 12, wherein the cost term is $\|d \circ w\|^2$, where $d=\{d_1, d_2, \ldots d_i, \ldots d_N\}^T \in R^{N \times 1}$, and $\circ$ denotes the Hadamard product.

14. The system of claim 13 wherein $$d_i = e^{\frac{\|y-x_i\|^2}{2\delta_f^2}},$$

where $\delta_f$ is a numerical parameter.

15. The system of claim 10 in which the data characterizing the cup region of the eye comprises a cup-to-disc ratio value.

16. The system of claim 10 further in which the processor is arranged to select said portion of the retinal image by segmenting the disc region in the retinal image.

17. The system of claim 10 in which the data characterizing the cup region of the optic disc of the retinal image comprising data indicating at least one of (a) a size of the optic cup and (b) a location of the optic cup.

18. The system of claim 10 in which the corresponding cup data comprises at least one of (a) a cup-to-disc ratio value, (b) a location of the cup, (c) a size of the cup and (d) clinical diagnosis results associated with the cup of the eye.

19. A non-transitory computer-readable medium having stored thereon computer program instructions for performance by a computer system to obtain, from a retinal image of an eye, data characterizing the cup region of the optic disc of the eye, said computer program instructions being operative, when implemented by a processor of the computer system, to cause the processor of the computer system to:

access a database of N reference retinal images, labelled by an index i=1, . . . N, each reference retinal image being associated with corresponding cup data characterizing a corresponding cup region of the reference retinal image;

obtain, for each reference retinal image i, a corresponding weight value $w_i$, the weight values minimizing a cost function comprising:

a construction error term indicating a difference between a portion of the retinal image and a sum of the reference retinal images weighted by the corresponding weight value $w_i$; and a cost term; and use the set of weight values and the corresponding cup data, to obtain the data characterizing the cup region of the optic disc of the retinal image.

20. The non-transitory computer-readable medium of claim 19 in which the corresponding cup data comprises at least one of (a) a cup-to-disc ratio value, (b) a location of the cup, (c) a size of the cup and (d) clinical diagnosis results of the eye.

* * * * *